United States Patent Office 2,839,521
Patented June 17, 1958

2,839,521
AZO DYESTUFFS CONTAINING HEAVY METAL

Guido Schetty, Basel, Switzerland, assignor to J. R. Geigy A.-G., Basel, Switzerland, a Swiss firm No Drawing. Application April 19, 1955
Serial No. 502,510

Claims priority, application Switzerland April 21, 1954

9 Claims. (Cl. 260—147)

The present invention concerns heavy metal containing azo dyestuffs which are distinguished by their pure shades, a very good fastness to light and the high stability of their complexes. It is also concerned with processes for the production of the new heavy metal containing azo dyestuffs as well as their use for the dyeing of natural or synthetic polypeptide fibres. In addition, it concerns the production of fast dyed polypeptide material which has been dyed by the use of these heavy metal containing azo dyestuffs.

It has been found that very valuable metal containing azo dyestuffs can be produced by coupling a diazotised amino compound of the benzene series containing, in the ortho position to the diazotised amino group, a sulphonic acid amide radical which is substituted at the nitrogen atom of the sulphamide group by an organic radical, which latter radical contains a substituent capable of taking part in the complex formation, with an azo component with couples in the neighbouring posiiton to a phenolic or enolic hydroxyl group. The azo dyestuff obtained is then converted into a metal containing azo dyestuff with an agent giving off a complex forming heavy metal.

Amides of possibly further substituted o-aminobenzene sulphonic acids which are derived from primary organic amines which contain groups capable of co-ordination in such positions that, together with the amino-nitrogen atom they are capable of forming a chelate linkage at the heavy metal atoms, are suitable diazo components. If the organic radical of the sulphamide group is of an aliphatic nature then the carboxyl group can be used as the group capable of co-ordination. It is of advantage if the carboxyl group is bound to the same carbon atom as the amino group. Derivatives of aliphatic α-aminocarboxylic acids and, preferably of aminoacetic acid, can be used. If the organic radical of the sulphamide group is of an aromatic nature then the carboxyl group or the phenolic hydroxyl group can be used as groups capable of co-ordination. These should be in the ortho-position to the amino group. In particular, derivatives of aromatic o-aminocarboxylic acid, e. g. of anthranilic acids, 2-aminonaphthalene-3-carboxylic acids as well as derivatives of aromatic o-hydroxyamino compounds, preferably of o-aminophenols can be used. Both the benzene ring of the o-aminobenzene sulphonic acid radical and also the ring of an aromatic radical of the sulphamide group can also be further substituted if desired, i. e. they may contain the substituents usual in azo dyestuffs, e. g. halogen, alkyl, alkoxy, acylamino, sulphonic acid, modified sulphonyl groups. Examples of modified sulphonyl groups are the sulphonic acid amide group, including sulphonic acid amide groups organically substituted at the nitrogen atom, as well as alkyl or aralkyl sulphonyl groups. The diazo components used according to the present invention are diazotised by methods known per se in a mineral acid medium in the cold by means of alkali nitrites.

Actually, all usual aliphatic aromatic or heterocyclic compounds which couple in the neighbouring position to a phenolic or enolic hydroxyl group can be used as a coupling components, such as for example, acylacetic acid aryl amides, 5-pyrazolones, 2,4-dihydroxyquinolines, 4-alkylphenols, 2-naphthols with a free 1-position and 1-naphthols, the 2-position of which is free and the 4-position is occupied or hindered.

The coupling components can be free from acid water solubilising groups or they may contain sulphonic acid groups according to the intended use of the metal containing end products. Preferred coupling components are the 1-phenyl-3-methyl-5-pyrazolones as well as the naphthols and their sulphonic acids.

The coupling is performed in the usual manner in an alkaline medium, if necessary with the addition of agents which accelerate the coupling such as for example, strong organic tertiary nitrogen bases.

Simple or complex salts as well as the oxides or hydroxides of the heavy metals usual in metal containing azo dyestuffs can be used for the metallisation. Chromium compounds are used for the production of wool dyestuffs to be dyed from an acid bath; chromium, cobalt and copper compounds are used for the production of dyestuffs to be dyed from a weakly acid bath. In addition to those listed above also nickel or iron compounds are used for lacquer dyestuffs. The metallising is performed in the usual manner in aqueous or organic solution or suspension, if necessary in closed vessels and under pressure, by heating with the agents giving off metal. Complex chromium compounds are particularly valuable for the dyeing of polypeptide fibres whilst metal containing dyestuffs which contain no sulphonic acid groups are suitable for the dyeing from a neutral to weakly acid bath of natural and synthetic polypeptide fibres such as wool, silk, Lanital, superpolyamide and superpolyurethane fibres and the complex chromium compounds of azo dyestuffs containing sulphonic acid groups are suitable for the dyeing of wool from a strongly acid bath. These complex chromium compounds are produced advantageously in aqueous solution or suspension by boiling under reflux with normal or complex salts of chromium or in a closed vessel under pressure with such amounts of the agents giving off chromium that there is at least one chromium atom to one dyestuff molecule. The usual salts of trivalent chromium such as chromic chloride, chromic sulphate, chromic acetate, chromic formiate or chromium salt of naphthalene sulphonic acid can be used as agents giving off metal. In single cases, the use of complex salts of chromium, preferably the alkali salts of disalicylato chromic acid is recommended. The dyestuffs containing one chromium atom per dyestuff molecule bound in complex linkage are obtained particularly easily and they are of uniform quality. They are distinguished by pure shades, remarkable stability and good fastness to light. In contrast to the 1:1 chromium complexes of usual unsulphonated o,o'-dihydroxyazo dyestuffs, the 1:1 complexes of the unsulphonated azo dyestuffs usable according to this invention are very good for the dyeing of natural and synthetic polypeptide fibres from dyebaths the reactions of which are about neutral. The shades attained therewith are distinguished by their purity, very good fastness to light and good fastness to alkali. Complex chromium compounds of the type containing one chromium atom to one dyestuff molecule of the sulphonated azo dyestuffs behave like the usual sulphonated chromium containing dyestuffs which are dyed from a strongly acid bath on to wool.

The new metal containing dyestuffs correspond to the general Formula I

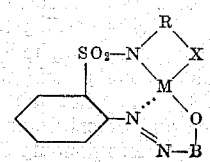

In this formula:

R represents the organic radical of the sulphamide group,
X represents the radical of the metallisable group of this substituent,
B represents the radial of an azo component coupling in the neighbouring position to a hydroxyl group, and
M represents heavy metal bound in complex linkage, whilst the benzene ring can be further substituted as is usual in azo dyestuffs. The new heavy metal containing dyestuffs are yellow, orange, red or brown coloured powders which are water soluble and they can be used, according to the composition, for the fast dyeing from a neutral, weakly to strong acid bath of lacquers, natural and synthetic polypeptide fibres as well as of leather.

The following examples illustrate the production and the use of the metal containing azo dyestuffs according to this invention without limiting it in any way. Where not otherwise stated, parts are given as parts by weight and the temperatures are in degrees centigrade. The relationship of parts by weight to parts by volume is as that of kilogrames to litres.

EXAMPLE 1

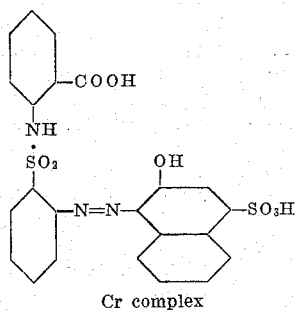

Cr complex 29.2 parts of 2-aminobenzene-1-sulphonic acid-(2'-carboxyphenylamide) are dissolved with 8 parts of sodium hydroxide in 120 parts of hot water and 6.9 parts of sodium nitrite are added. The cooled solution is slowly added dropwise at 0–5° to a mixture of 46 parts of concentrated hydrochloric acid and 100 parts of water. The diazonium compound precipitates as a yellow precipitate. This is neutralised with sodium bicarbonate and poured at 0–3° into a solution of 25.2 parts of the sodium salt of 2-hydroxynaphthalene-4-sulphonic acid and 12 parts of sodium carbonate in 150 parts of water. On completion of the coupling, the dyestuff is precipitated by the addition of sodium chloride and is filtered off. The damp dyestuff paste is boiled under reflux for 30 hours in 1000 parts of water with 120 parts of basic chromic sulphate solution (corresponding to 6.2 parts of Cr). A slight precipitate is filtered off hot and sodium chloride is added to the filtrate. The chromium containing dyestuff is filtered off and dried. It is a red powder which dyes wool from a sulphuric acid bath in very level, clear, bluish-red shades which have very good fastness to light, milling and perspiration.

Chromium containing dyestuffs with similar properties are obtained if instead of 29.2 parts of 2-aminobenzene-1-sulphonic acid-(2'-carboxyphenylamide), 32.7 parts of 4-chloro-2-aminobenzene-1-sulphonic acid - (2' - carboxyphenylamide) or 2-aminobenzene-1-sulphonic acid--(5'-chloro-2'-carboxyphenylamide) are used.

2-aminobenzene-1 - sulphonic acid-(2' - carboxyphenylamide) is obtained by reacting 2-nitrobenzene sulphonic acid chloride with 2-aminobenzoic acid in water with a weakly alkaline reaction and reducing the condensation product with iron powder according to Béchamp.

If, instead of 2-nitrobenzene sulphonic acid chloride, 4-chloro-2-nitrobenzene sulphonic acid chloride is used or instead of 2-aminobenzoic acid, the 4-chloro-2-aminobenzoic acid is used and otherwise the same procedure is followed, then the corresponding 2-aminobenzene-1-sulphonic acid-(2'-carboxyphenylamides) substituted by chlorine atoms are obtained.

EXAMPLE 2

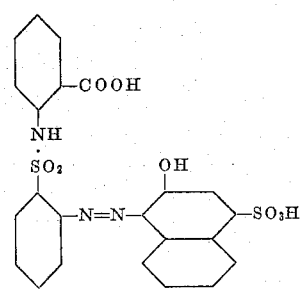

Cu complex

The monoazo dyestuff produced according to Example 1 is heated for 20 hours at 40–50° in the form of a damp paste in 700 parts of water with 100 parts of an ammoniacal cupritetrammine sulphate solution (corresponding to 12.8 parts of Cu). The metal containing dyestuff is precipitated by the addition of sodium chloride, filtered off, washed with 20% sodium chloride solution and dried. It is a red-brown powder which dyes wool from an acid bath in very fast to light brown shades.

EXAMPLE 3

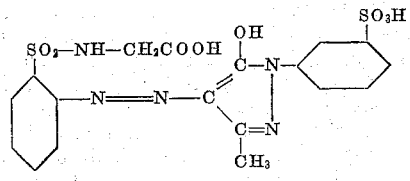

Cr complex 23 parts of 2-aminobenzene-1-sulphonic acid glycinide in 200 parts of water and 35 parts of concentrated hydrochloric acid are diazotised at 0–5° with a concentrated solution of 6.9 parts of sodium nitrite in 20 parts of water. The diazo compound is added to a solution of 26.6 parts of 1-(3'-sulphophenyl)-3-methyl-5-pyrazolone and 33 parts of sodium carbonate in 350 parts of water. On completion of the dyestuff formation, the whole is heated to 70°, the dyestuff is precipitated by the addition of sodium chloride, filtered off, pasted in 700 parts of water and boiled under reflux for 22 hours with 120 parts of a solution of basic chromic sulphate (corresponding to 6.25 parts of Cr). The precipitate is removed by filtration and the filtrate is evaporated to dryness. A yellow powder is obtained which dyes wool from a sulphuric acid bath in level, greenish-yellow shades which have excellent fastness to light and good wet fastness properties. 2-aminobenzene-1-sulphonic acid glycinide is produced as follows:

Glycine ethyl ester is condensed with 2-nitrobenzene-1-sulphonic acid chloride, the condensation product is saponified by heating with diluted caustic soda to form 2-nitrobenzene-1-sulphonic acid glycinide and this is reduced with iron powder according to Béchamp.

EXAMPLE 4

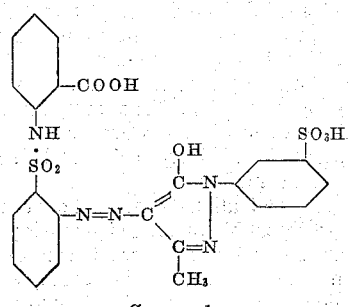

Cr complex 29.2 parts of 2-aminobenzene-1-sulphonic acid-(2'-carboxyphenylamide) are diazotised as described in Example 1 and coupled with 26.6 parts of 1-(3'-sulphophenyl)-3-methyl-5-pyrazolone. The monoazo dyestuff is salted out and filtered off and boiled for 3 hours in 700 parts of water with 200 parts of a solution of ammonium chromosalicylate. The clear yellow solution is then evaporated to dryness and in this way a yellow powder is obtained which dyes wool from a formic acid or sulphuric acid bath in greenish-yellow shades which are fast to washing, milling, perspiration, sea water and which have excellent fastness to light.

If instead of 1-(3'-sulphophenyl)-3-methyl-5-pyrazolone the same number of parts of 1'-(3'-sulphamidophenyl)-3-methyl-5-pyrazolone are used and otherwise the same procedure is followed, then a dyestuff is obtained which requires less acid for dyeing and the colour of which is more red.

EXAMPLE 5

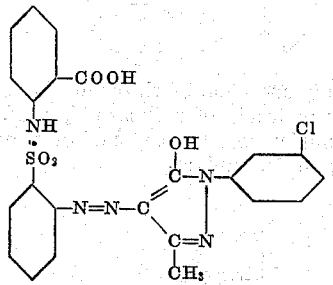

Cr complex 29.2 parts of 2-aminobenzene-1-sulphonic acid-(2'-carboxyphenylamide) are diazotised as described in Example 1, the yellow diazo suspension is neutralised with sodium bicarbonate and at 0–3°, the whole is poured into a solution of 22 parts of 1-(3'-chlorophenyl)-3-methyl-5-pyrazolone and 4 parts of sodium hydroxide in 400 parts of water. On completion of the dyestuff formation, the dyestuff is precipitated by the addition of sodium chloride, filtered off and dried. The dyestuff is then heated for 2½ hours at 135° in 250 parts of formamide with 25 parts of chromic acetate (corresponding to 6.2 parts of Cr) and the yellow solution formed is poured into a mixture of 150 parts of concentrated hydrochloric acid and 2000 parts of water. The chromium containing dyestuff precipitates in the form of a yellow precipitate. It is filtered off, washed and dried. It is a clay-yellow coloured powder which, after grinding with trisodium phosphate and a disperser, is soluble in water. It dyes wool from a weakly acetic acid bath in pure greenish-yellow shades which have very good fastness to light.

EXAMPLE 6

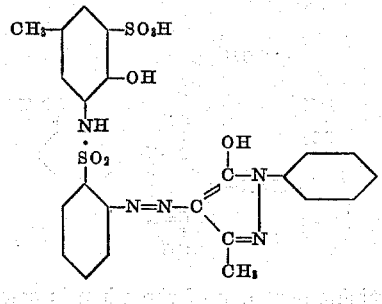

Cr complex 35.8 parts of 2-aminobenzene-1-sulphonic acid-(5'-methyl-3'-sulpho-2'-hydroxyphenylamide) are dissolved in 300 parts of hot water and 6 parts of sodium carbonate, 6.9 parts of sodium nitrite are added and the whole is poured at 0–5° while stirring into a solution of 35 parts of concentrated hydrochloric acid and 100 parts of water. The diazonium compound precipitates as a brownish-yellow precipitate. It is poured into a solution of 18.8 parts of 1-phenyl-3-methyl-5-pyrazolone and 40 parts of sodium carbonate in 400 parts of water and on completion of the coupling the monoazo dyestuff formed is isolated by the addition of sodium chloride. The dyestuff is then heated for 20 hours with a chromic formiate solution (corresponding to 5.7 parts of Cr), a slight precipitate is filtered off, and the chromium containing dyestuff is precipitated at 60° by the addition of sodium chloride. It is filtered off and dried. The dyestuff is a brown-yellow powder which dyes wool from a formic acid or sulphuric acid bath in level, reddish-yellow shades. The dyeings have very good fastness to light and very good fastness to washing, milling and perspiration.

2-aminobenzene-1-sulphonic acid-(5'-methyl-3'-sulpho-2'-hydroxyphenylamide) is produced as follows: 2-nitrobenzene sulphonic acid chloride is condensed with 2-amino-4-methyl-1-hydroxy-benzene-6-sulphonic acid in water, the reaction being weakly alkaline, and the condensation product is reduced according to Béchamp with iron powder.

Table

| Diazo component | Coupling component | Metal | Colour of the metal complex on wool |
|---|---|---|---|
| 2-aminobenzene-1-sulphonic acid-(2'-carboxyphenylamide). | 4-acetyl-1-hydroxynaphthalene-8-sulphonic acid. | Cr | bluish-red. |
| Do | do | Cu | red-brown. |
| Do | 4-methyl-1-hydroxynaphthalene-8-sulphonic acid. | Cu | wine-red. |
| Do | 1-hydroxynaphthalene-5-sulphonic acid. | Cu | brown. |
| Do | 2-hydroxynaphthalene-6-sulphonic acid. | Cr | bluish-red. |
| Do | 1-(3'-sulphamidophenyl)-3-methyl-5-pyrazolone. | Cr | greenish-yellow. |
| Do | 1-(4'-sulpho)-phenyl-3-carboxy-5-pyrazolone. | Cu | green-yellow. |
| Do | do | Cr | greenish-yellow. |
| Do | 2-hydroxynaphthalene-3,6-disulphonic acid. | Cr | bluish-red. |
| Do | 2-hydroxynaphthalene-6,8-disulphonic acid. | Cr | Do. |
| Do | do | Cu | brown. |
| Do | 1-(2',5'-dichloro-4'-sulpho)-phenyl-3-methyl-5-pyrazolone. | Cr | greenish-yellow. |
| Do | do | Cu | green-yellow. |
| 4-chloro-2-amino-benzene-1-sulphonic acid-(2'-carboxyphenylamide). | 1-(3'-chlorophenyl)-3-methyl-5-pyrazolone. | Cr | greenish-yellow. |
| Do | do | Cu | green-yellow. |
| Do | 1-hydroxynaphthalene-4-sulphonic acid. | Cr | red. |
| 2-aminobenzene-1-sulphonic acid-(5'-chloro-2'-carboxyphenylamide). | 1-(3'-chlorophenyl)-3-methyl-5-pyrazolone. | Cr | greenish-yellow. |
| 2-aminobenzene-1-sulphonic acid glycinide. | do | Cr | Do. |
| Do | do | Co | yellow. |
| Do | 2-hydroxynaphthalene | Cr | brownish-red. |
| Do | do | Co | red. |
| 2-aminobenzene-1-sulphonic acid-(2'-hydroxyphenylamide). | 1-(3'-chlorophenyl)-3-methyl-5-pyrazolone. | Cr | yellow. |
| Do | 2-naphthol | Cr | brownish-red. |
| 4-methyl-2-amino-benzene-1-sulphonic acid-(2'-carboxyphenylamide). | do | Cr | Do. |
| 4-methylsulphonyl 2-aminobenzene-1-sulphonic acid-(2'-carboxyphenylamide). | 2-naphthol-6-sulphonic acid methyl amide. | Cr | Do. |

What I claim is:

1. A complex heavy metal compound of a monoazo dyestuff having the general formula:

wherein A represents a benzene nucleus containing the —SO₂—NH—D radical in ortho-position to the azo group, B represents a radical selected from the group consisting of a hydroxynaphthalene radical bound to the azo group in ortho-position to the hydroxyl group and a 5-pyrazolone radical bound to the azo group in 4-position, and D represents an organic radical selected from the group consisting of the lower α-carboxyalkyl, o-carboxyphenyl and o-hydroxyphenyl radicals, said compound containing one atom of metal in complex combination per molecule of monoazo dyestuff.

2. A complex heavy metal compound of a monoazo dyestuff having the general formula:

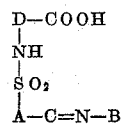

wherein A represents a benzene nucleus containing the —SO₂—NH—D—COOH radical in ortho-position to the azo group, B represents a radical selected from the group consisting of a hydroxynaphthalene radical bound to the azo group in ortho-position to the hydroxyl group and a 5-pyrazolone radical bound to the azo group in 4-position, and D—COOH represents an o-carboxyphenyl radical, said compound containing one atom of metal in complex combination per molecule of monoazo dyestuff.

3. A complex chromium compound of a monoazo dyestuff having the general formula:

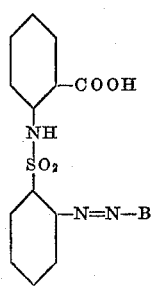

wherein B represents a radical selected from the group consisting of a hydroxynaphthalene radical bound to the azo group in ortho-position to the hydroxyl group and a 5-pyrazolone radical bound to the azo group in 4-position, said compound containing one atom of chromium in complex combination per molecule of monoazo dyestuff.

4. A member selected from the group consisting of the complex chromium and copper compounds of a monoazo dyestuff having the general formula:

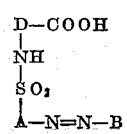

wherein A represents a benzene nucleus containing the —SO₂—NH—D—COOH radical in ortho-position to the azo group, the other ortho-position being unsubstituted, B represents a radical selected from the group consisting of a hydroxynaphthalene radical bound to the azo group in the ortho-position to the hydroxyl group and a 5-pyrazolone radical bound to the azo group in 4-position, and D—COOH represents an o-carboxyphenyl radical, said compound containing one atom of metal in complex combination per molecule of monoazo dyestuff.

5. The complex chromium compound of a monoazo dyestuff having the formula:

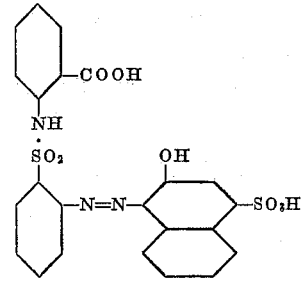

and containing one atom of chromium in complex combination per molecule of monoazo dyestuff.

6. The complex copper compound of a monoazo dyestuff having the formula:

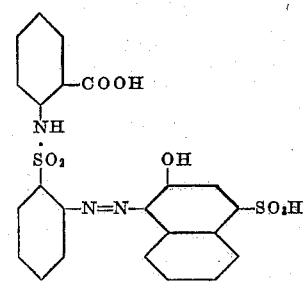

and containing one atom of copper in complex combination per molecule of monoazo dyestuff.

7. The complex chromium compound of a monoazo dyestuff having the formula:

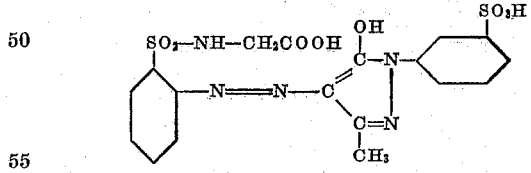

and containing one atom of chromium in complex combination per molecule of monoazo dyestuff.

8. The complex chromium compound of a monoazo dyestuff having the formula:

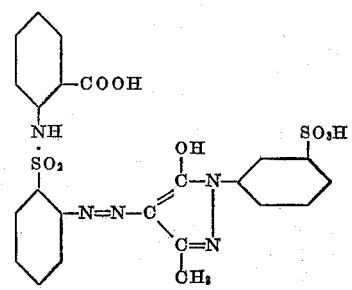

and containing one atom of chromium in complex combination per molecule of monoazo dyestuff.

9. The complex chromium compound of a monoazo dyestuff having the formula:
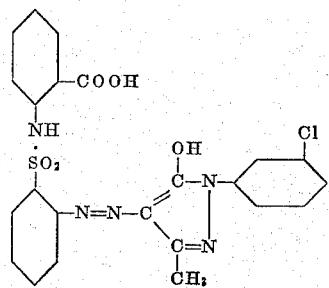
and containing one atom of chromium in complex combination per molecule of monoazo dyestuff.
References Cited in the file of this patent
UNITED STATES PATENTS
| | | |
|---|---|---|
| 2,094,832 | Winkeler et al. | Oct. 5, 1937 |
| 2,182,055 | Schweitzer | Dec. 5, 1939 |
| 2,227,523 | Widmer | Jan. 7, 1941 |
| 2,317,733 | Conzetti et al. | Apr. 27, 1943 |
| 2,597,676 | Schetty | May 20, 1952 |